United States Patent
Monnes et al.

(10) Patent No.: US 6,459,440 B1
(45) Date of Patent: Oct. 1, 2002

(54) METHOD AND APPARATUS FOR AUTOMATIC DELETION OF A POP-UP WINDOW

(75) Inventors: Peter J. Monnes, Boca Raton, FL (US); Randi Faris, Boca Raton, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/351,490

(22) Filed: Jul. 15, 1999

(51) Int. Cl.[7] .................................................. G06F 3/14
(52) U.S. Cl. ...................................................... 345/808
(58) Field of Search ................................. 345/808, 809, 345/710, 752, 780, 781, 788, 790, 806

(56) References Cited

U.S. PATENT DOCUMENTS

| | | | |
|---|---|---|---|
| 4,555,775 A | | 11/1985 | Pike ............................ 345/790 |
| 4,823,108 A | | 4/1989 | Pope ............................ 345/806 |
| 5,414,810 A | * | 5/1995 | Doyle et al. ................. 345/804 |
| 5,546,525 A | * | 8/1996 | Wolf et al. ................... 345/809 |
| 5,821,928 A | * | 10/1998 | Melkus et al. ............... 345/809 |
| 5,825,358 A | * | 10/1998 | Silvent et al. ............... 345/809 |
| 5,847,705 A | | 12/1998 | Pope ............................ 345/790 |
| 6,008,810 A | * | 12/1999 | Bertram et al. ............. 345/809 |
| 6,118,451 A | * | 9/2000 | Alexander et al. .......... 345/809 |
| 6,232,971 B1 | * | 5/2001 | Haynes ........................ 345/800 |

\* cited by examiner

Primary Examiner—Crescelle N. dela Torre
(74) Attorney, Agent, or Firm—Randi L. Dulaney

(57) ABSTRACT

An electronic device (12) includes in one embodiment a display (14), at least one application (20) that generates a pop-up window (10) which is displayed on the display (14); and an application manager (16). The application manager (16) deletes the pop-up window (10) in response to an input (26) from the application (20). The electronic device (12) includes in a second embodiment a display (14) that displays a pop-up window (10), a plurality of applications (18) having corresponding application messages (42), a buffer (38) for storage of application messages (42), a display controller (40), and an application manager (16). The application manager (16) deletes an application message (33) stored in the buffer (38) in response to an input (26) from an application (20).

9 Claims, 6 Drawing Sheets

METHOD AND APPARATUS FOR AUTOMATIC DELETION OF A POP-UP WINDOW

FIELD OF THE INVENTION

This invention relates in general to electronic devices, and in particular to the management of pop-up windows displayed on electronic devices.

BACKGROUND OF THE INVENTION

Electronic devices, such as personal digital assistants, pagers, cellular telephones, computers, GPS receivers, database managers and wireless internet devices, continue to increase in functionality, complexity, and availability. Application programs within the electronic device provide a multiplicity of functionality for the end user. Typical application programs are schedulers, address books, notepads, alarm clocks, system maintenance, and messaging.

With increased functionality and complexity, simplification of the user interface grows in importance. Simplification of the user interface in electronic devices today includes the use of pop-up windows. A pop-up window is a viewing area within a display that provides a visual alert when an event, such as an incoming message, an alarm clock reminder, a calendar appointment, a low battery warning, a low memory warning or a printer error, has occurred.

The pop up window may be a full screen or a portion of the screen and represents a bordered region, typically of rectangular shape into which a message is displayed. As events occur, a pop-up window corresponding to each event is displayed. Typically, an audible or vibratory alert is also activated concurrently with the posting of the pop-up window. Pop-up windows pile up indefinitely, each on top of the previous like a deck of cards. The user views them in the reverse order from which they arrive, starting with the most recent. The user dismisses each one by selecting one of the choices on the pop-up window typically through the pressing of a button on the electronic device. Each application program receives notification of the user's selection as the corresponding pop-up window moves to the top of the pile and is acted upon by the user.

An electronic device may also include a receiver, functioning similarly to a wireless communication device. Wireless applications provide the end user up to the minute stock prices, weather, traffic reports, and other "need to know" information. Query applications further provide wireless access to information such as restaurant reviews, show times, sports scores and flight information. Sending and receiving short messages also is possible. With wireless connectivity, pop-up windows additionally include notification of the receipt of a message, or notification of an event received in a message such as a stock price or weather warning, out of range of the transmitter notification, and loss of system contact.

In some electronic devices, pop-up windows can be changed if an event changes. For example, in a wireless communication device, a pop up window with the message "you have 2 messages" is changed to "you have 3 messages" when a new message is received.

The electronic device has a limited amount of memory that can be devoted to the storage of pop-up window information. Also, the number of asynchronous events that can possibly occur while the user is not in the proximity of the device is theoretically unlimited. Since it is not possible to determine whether the user is viewing the display, pop-up windows are continuously shown as the events that cause them occur. Additionally, the information in a particular pop-up window may become obsolete. For example, a pop-up window with the message "low battery" is still displayed even after the battery is replaced until the user interacts with the pop-up window. Similarly, a printer error such as printer out of paper is still displayed even after the paper is replaced until the user interacts with the pop-up window. Messages such as "cannot communicate with the system" similarly remain until the user interacts with the pop up window. In this case, a user sending a message to the system and receiving such a pop up window would resend the message even though the system contact had been reinstated and the message sent. The recipient then receives the message twice from the sender, resulting in confusion for both the sender and the recipient.

To eliminate confusion and minimize the memory used for pop-up windows, it is desirable for an electronic device to have the capability to automatically delete a pop-up window when it is no longer necessary or has become obsolete without any user interaction.

DESCRIPTION OF THE PREFERRED EMBODIMENT

Figure 1:
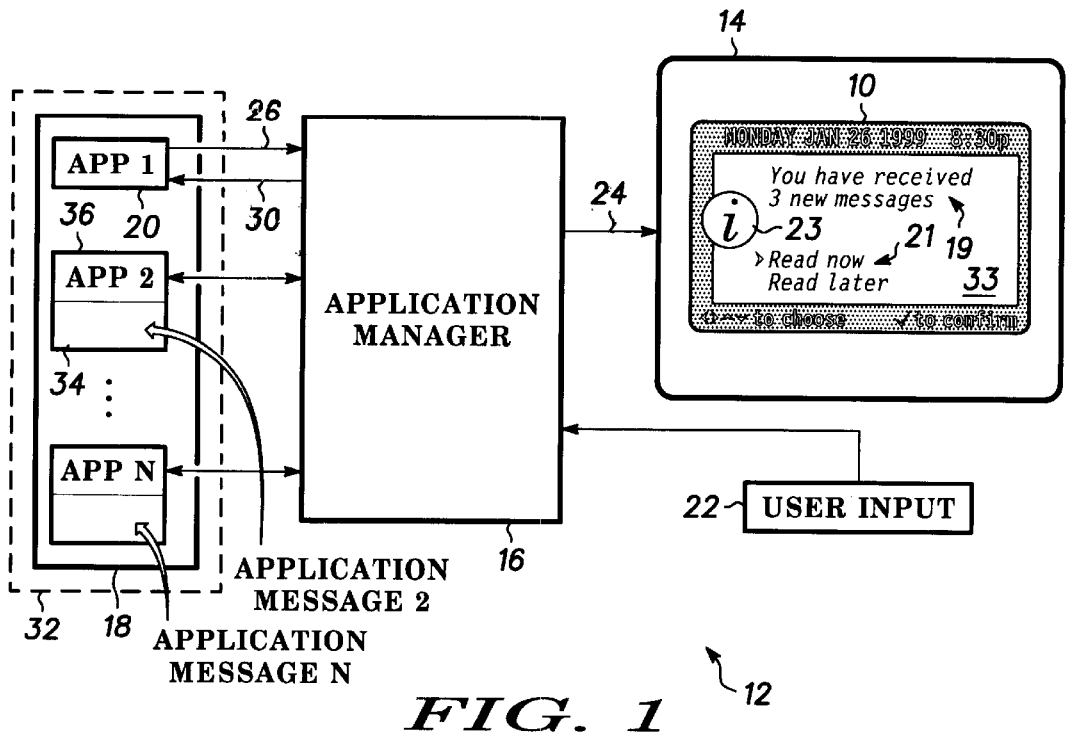
FIGS. 1, 2, 3, 4, and 5 are block diagrams of various embodiments of an electronic device that utilizes a pop-up window in accordance with the present invention.

Referring to FIG. 1, a block diagram of an electronic device 12 in accordance with the present invention is shown. The electronic device 12 preferably includes a display 14, an application manager 16, a plurality of applications 18, and a user input 22.

The plurality of applications 18 are preferably stored in a memory 32 of the electronic device 12 including such memory types as random access memory (RAM), read-only memory (ROM), and electrically erasable programmable read-only memory (EEPROM). At least a first application 20 provides a value-added service such as calculator, stock market analysis, notepad, or alarm clock. The electronic device 12 performs various functions within the first application 20. For example, the end user sets an alarm clock value within the first application 20 and the first application 20 activates an alert when the alarm clock value set is reached.

The display 14 includes a display driver, a display memory and a viewing area for communication with other elements of the electronic device 12 and for control of visual notification to the end user. The visual notification of the display 14 may be, for example, accomplished on a full or partial starburst liquid crystal display. It will be appreciated that other similar displays can be utilized for the display 14.

The display 14 further includes a pop-up window 10 for visual notification to the end user when an event, such as an incoming message, an alarm clock reminder, a calendar appointment, a low battery warning, a low memory warning or a printer error, has occurred. The pop-up window 10 may be a full screen or a portion of the screen and represents a bordered region, typically of rectangular shape into which a message is displayed. The pop-up window 10 typically has recognizable decorative elements that set it apart from other similar display elements. The pop-up window consists of several parts. It has a text portion 19 that provides the user with information such as what the event was, what the event means, and what to do about the event. It also has a choice portion 21, which provides the user with options for responding to or acknowledging the pop-up window 10. Lastly, the pop-up window 10 has a graphics portion 23 that provides a quick visual of basic information about the first application 20, the urgency, or the type of event that generated the pop-up window 10. For example, the text portion 19 of the pop-up window 10 may be "new phone entry", the choice portion 21 may be "do you want to save phone entry?"and the graphics portion 23 may be the symbol of a telephone.

When the first application 20 generates a first application message 33 requiring visual notification to the end user, the application manager 16 preferably sends a command 24 to the display 14 to generate a visual notification of the first application message 33 in response to an input 26 from the first application 20. When the display 14 receives the command 24 from the application manager 16, the pop-up window 10 including the first application message 33 is displayed. When the application manager 16 detects the user input 22, such as a user depressing a button in response to the pop-up window 10, the application manager 16 sends a response 30 to the first application 20 for use in the operation of the first application 20.

For example, the first application 20 may be a calendar application and the pop-up window 10 may be a meeting notification message including two choices for the user: dismiss and reminder. When the user input 22 selects "reminder", the application manager 16 then sends the response 30 of "reminder chosen" to the first application 20. The first application 20 upon receipt of the response 30 updates its database to initiate a reminder notification at a later predetermined time.

Preferably, the application manager 16 is similar to the MC68328 micro-controller manufactured by Motorola, Inc. of Schaumburg, Ill. It will be appreciated that other similar processors can be utilized for the application manager 16, and that additional processors of the same or alternative type can be added as required to handle the processing requirements of the application manager 16.

After the pop-up window 10 is displayed for viewing on the display 14, the pop-up window 10 displayed may become obsolete or no longer necessary. In prior art systems, the user input 22 is required in order to remove the pop-up window 10 from the display 14, often resulting in end user confusion.

In the present invention, this confusion is eliminated. In the present invention, the first application 20 sends the input 26 to the application manager 16 informing the application manager 16 that the pop-up window 10 is obsolete or no longer necessary. The application manager 16 is programmed to send the command 24 to the display 14 to delete the pop-up window 10 in response to the input 26. The pop-up window 10 then disappears from viewing without receiving a signal from the user input 22. For example, a low battery warning would disappear when a new battery was installed, a system fault would be removed when the fault was corrected, and a lack of communication notification would disappear when communication was re-established.

For added security, the pop-up window 10 preferably includes a unique identifier. The unique identifier may be the name of the controlling application or a password. Deletion of the pop-up window 10 is dependent therein also on receipt of the unique identifier confirming that the deletion of the pop-up window 10 is appropriate.

In some instances, a portion of the pop-up window 10 becomes obsolete or no longer necessary while the display of the other portions of the pop-up window 10 are still valid. The present invention further provides for the automatic deletion of the text portion 19, the choice portion 21, or the graphics portion 23 of the pop-up window 10. In the present invention, the first application 20 sends the input 26 to the application manager 16 informing the application manager 16 that the text portion 19, the choice portion 21, or the graphics portion 23 of the pop-up window 10 is obsolete or no longer necessary. The application manager 16 is programmed to send the command 24 to the display 14 to delete the obsolete portion of the pop-up window 10 in response to the input 26. The obsolete portion of the pop-up window 10 then disappears from the pop-up window 10 without the receipt of a signal from the user input 22.

For example, the pop-up window 10 may be a message informing the end user of a remote alarm whereby the text portion 19 is "alarm activated", the choice portion 21 is "request more information or dismiss?" and the graphics portion 23 is an emergency symbol. If the alarm is later turned off, the emergency symbol may no longer be needed whereas the end user still desires to know of the alarm. The deletion of the emergency symbol could serve the purpose of letting the end user know that the emergency had passed while the information in the text portion 19 and choice portion 21 would still be valid for informing the end user of the occurrence.

Automatically deleting the pop-up window or a portion of the pop-up window without user input is an extremely powerful addition to the electronic device eliminating user confusion caused by the viewing of an obsolete status or warning message.

The application manager 16 preferably is programmed to provide for the sharing of the pop-up window 10 by the plurality of applications 18. The application manager 16 gives ownership to one application at a time using a pre-programmed ownership algorithm. Ownership of the pop-up window 10 may be decided based on chronological receipt, priority of the application message, or priority of the category or application. Application messages are displayed on the pop-up window 10. Examples of application messages are a meeting description, a system failure description, or a weather report. When the first application 20 has ownership of the pop-up window 10, and a corresponding first application message 33 displayed on the pop-up window 10 becomes obsolete, the application manager 16 deletes the first application message 33 and gives ownership of the pop-up window 10 to a second application 36 having the next highest priority, and the second application message 34 is displayed on the pop-up window 10.

Further, all applications that do not have ownership of the pop-up window 10 store their application messages in their application memory until ownership is given to them. If the second application message 34 of the second application 36 not having ownership of the pop-up window 10 becomes obsolete, the second application 36 deletes the second application message 34 without the second application message 34 ever taking time, space or memory of the pop-up window 10. The end user thereby never is notified of the second application message 34, simplifying the operation of the electronic device 12. The automatic deletion both within the applications without ownership and by the application having ownership assures optimal use of the pop-up window 10 by the plurality of applications 18. As electronic devices continue to decrease in size and increase in complexity, the display area and memory usage become more valuable.

Sharing the pop-up window and automatically deleting obsolete messages ensures minimization of the required display size and memory, thereby maximizing device value and utilization.

Figure 2:
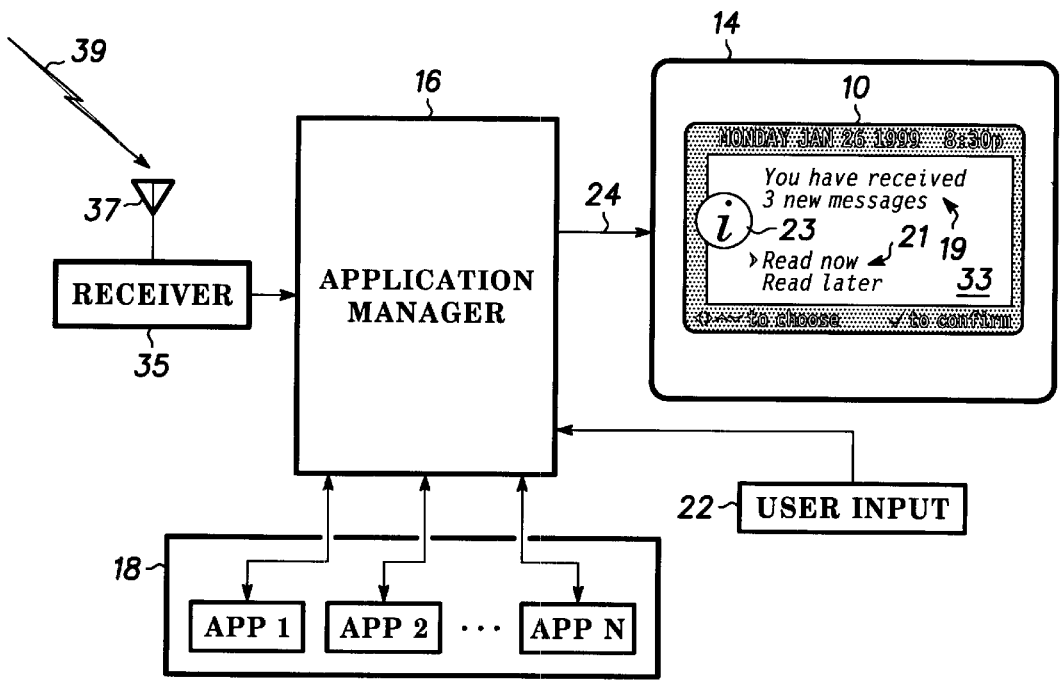

FIG. 2 is a block diagram of a preferred embodiment of the electronic device 12 of FIG. 1. The reference numbers of the embodiment of FIG. 1 have been retained for those elements that are common. The electronic device 12 includes all the elements and functionality illustrated in FIG. 1, and further comprises a receiver 35 and an antenna 37.

The antenna 37 intercepts RF signals from a wireless communication system. It will be appreciated that the wireless communication system may function utilizing any wireless RF channel, for example, a one or two way pager channel, a mobile cellular channel, or a mobile radio channel. Similarly, it will be appreciated that the wireless communication system may function utilizing other types of channels such as infrared channels. In the following description, the wireless communication system refers to any of the wireless communication systems mentioned above or an equivalent.

The antenna 37 is coupled to the receiver 35. The receiver 35 includes circuitry for receiving signals from the wireless communication system such as a message 39. Radio frequency signals received by the receiver 35 produce demodulated information. The receiver 35 further includes circuitry for processing the demodulated information using conventional demodulation techniques. The receiver 35 also includes message management capability for performing functions within the electronic device 12 in response to receipt of the message 39. For example, the receiver 35 stores the message 39 in a memory, and sends a command to activate an audible, vibratory, or visual alert to notify the user that the message 39 has been received.

To perform the necessary functions of the electronic device 12, the receiver 35 is coupled to the application manager 16. The application manager 16 operates as described previously for the electronic device 12 of FIG. 1. Further, upon receipt of the message 39, the receiver 35 informs the application manager 16 that the pop-up window 10 is to be deleted. The application manager 16, in response to notification of receipt of the message 39, then sends the command 24 to the display 14 to delete the pop-up window 10 and the display 14 deletes the pop-up window 10. The message 39 may include notification of an information update, correction of a system fault, or cancellation of an event. One skilled in the art will appreciate that the message 39 may contain one of the one of the previously mentioned notifications or an equivalent.

In another scenario, the message 39 prompts only a portion of the pop-up window 10 to be deleted. Upon receipt of the message 39, the receiver 35 informs the application manager 16 that the text portion 19, the choice portion 21, or the graphics portion 23 of the pop-up window 10 is to be deleted. The application manager 16, in response to notification of receipt of the message 39, then sends the command 24 to the display 14 to delete the text portion 19, the choice portion 21, or the graphics portion 23 of the pop-up window 10. Upon receipt of the command 24, the display 14 deletes the affected portion of the pop-up window 10. The message 39 may include notification of an information update, correction of a system fault, or cancellation of an event. One skilled in the art will appreciate that the message 39 may contain one of the one of the previously mentioned notifications or an equivalent.

For added security, the pop-up window 10 preferably includes a unique identifier. The unique identifier may be the name of the controlling application or a password. Deletion of the pop-up window 10 is dependent therein also on the received message 39 including the unique identifier, confirming that the deletion of the pop-up window 10 or a portion of the pop-up window 10 is appropriate.

Figure 3:
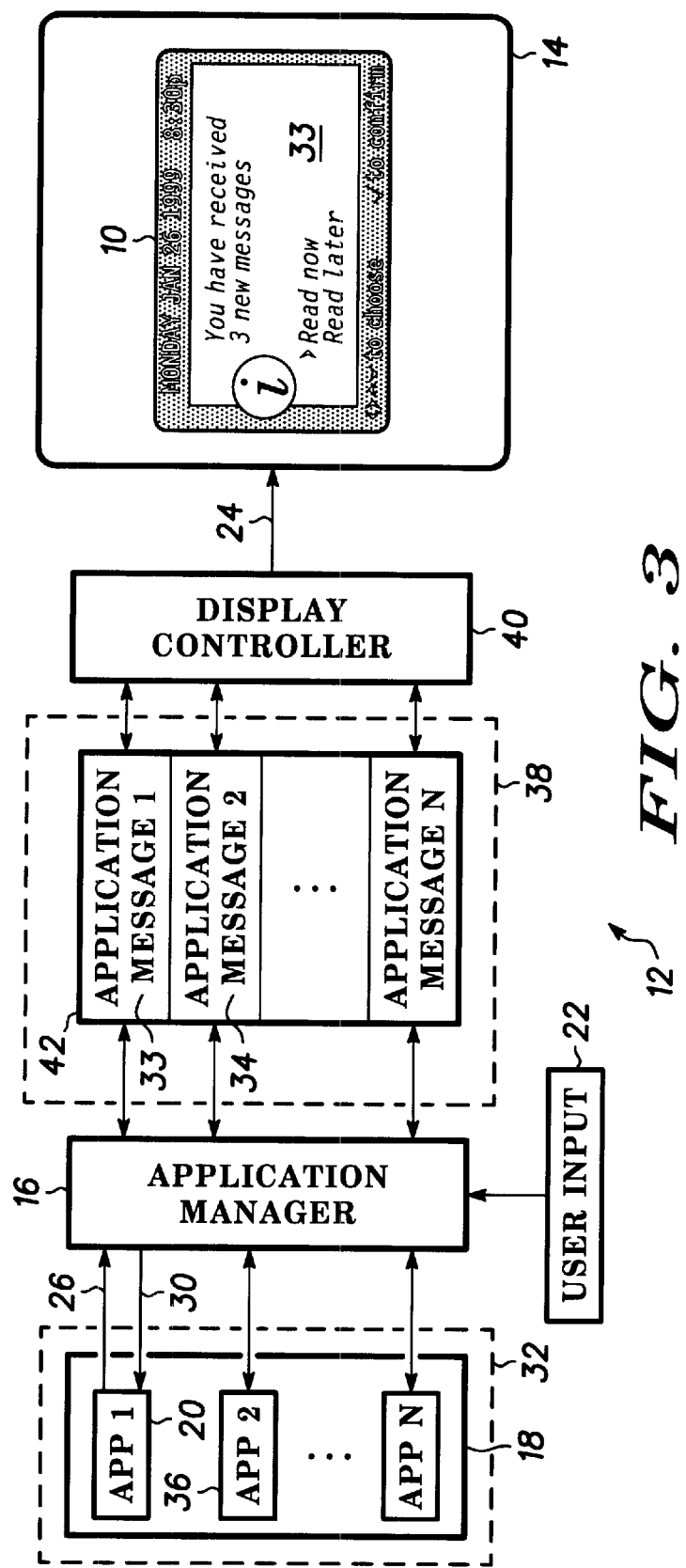

FIG. 3 is a block diagram of another embodiment of the electronic device 12. The reference numbers of the embodiment of FIG. 1 have been retained for those elements that are common. The electronic device 12 of FIG. 3 comprises the plurality of applications 18, the application manager 16, a buffer 38, a display controller 40, the display 14, and the user input 22.

The plurality of applications 18 is preferably stored in the memory 32 of the electronic device 12 including such memory types as random access memory (RAM), read-only memory (ROM), and electrically erasable programmable read-only memory (EEPROM). As described previously, at least a first application 20 provides a value-added service such as calculator, stock market analysis, calendar, or alarm clock or an equivalent; and the electronic device 12 performs various functions within the first application 20.

The buffer 38 resides in random access memory (RAM), flash memory, electrically erasable programmable read-only memory (EEPROM), or an equivalent. A plurality of application messages 42 is stored in the buffer 38. The application messages 42 include the text portion 19, the choice portion 21, and the graphics portion 23 of the information typically displayed on the pop-up window 10.

The display controller 40 is coupled between the buffer 38 and the display 14. The display controller 40 retrieves the first application message 33 from the buffer 38 and sends a command 24 to the display 14 to generate a visual notification of the first application message 33. When the display 14 receives the command 24 from the display controller 40, the pop-up window 10 is displayed. When the application manager 16 detects the user input 22, such as a user depressing a button in response to the pop-up window 10, the application manager 16 sends the response 30 to the first application 20 for use in the operation of the first application 20.

Preferably, the display controller 40 is similar to the MC68328 micro-controller manufactured by Motorola, Inc. of Schaumburg, Ill. It will be appreciated that other similar processors can be utilized for the display controller 40, and that additional processors of the same or alternative type can be added as required to handle the processing requirements of the display controller 40.

After the pop-up window 10 is displayed for viewing on the display 14, the pop-up window 10 may become obsolete or no longer necessary. Preferably, the first application 20 sends the input 26 to the application manager 16 informing the application manager 16 that the first application message 33 is obsolete or no longer necessary. The application manager 16 is programmed to delete the first application message 33 stored in the buffer 38 in response to the input 26. The display controller 40 periodically samples the buffer 38. When the display controller 40 detects a deletion of the first application message 33 from the buffer 38, the display controller 40 sends the command 24 to the display 14 to delete the pop-up window 10.

Automatically deleting both the application message from the buffer memory and the pop-up window from the display memory decreases memory and display requirements of the electronic device thereby allowing for lower cost and smaller size devices while simplifying the device operation.

The display controller 40 preferably is further programmed to provide for the sharing of the pop-up window 10 by the plurality of application messages 42. The display controller 40 gives ownership to one application at a time using a preprogrammed algorithm. When the first application message 33 of the first application 20 displayed in the pop-up window 10 becomes obsolete, the application manager 16 deletes the first application message 33 from the buffer 38. The display controller 40 detects the deletion of the first application message 33 from the buffer 38 and in response to the deletion gives ownership of the pop-up window 10 to the second application message 34 having the next highest priority. The automatic deletion assures optimal use of the pop-up window 10 by the plurality of applications 18 while decreasing memory and display requirements.

Figure 4:
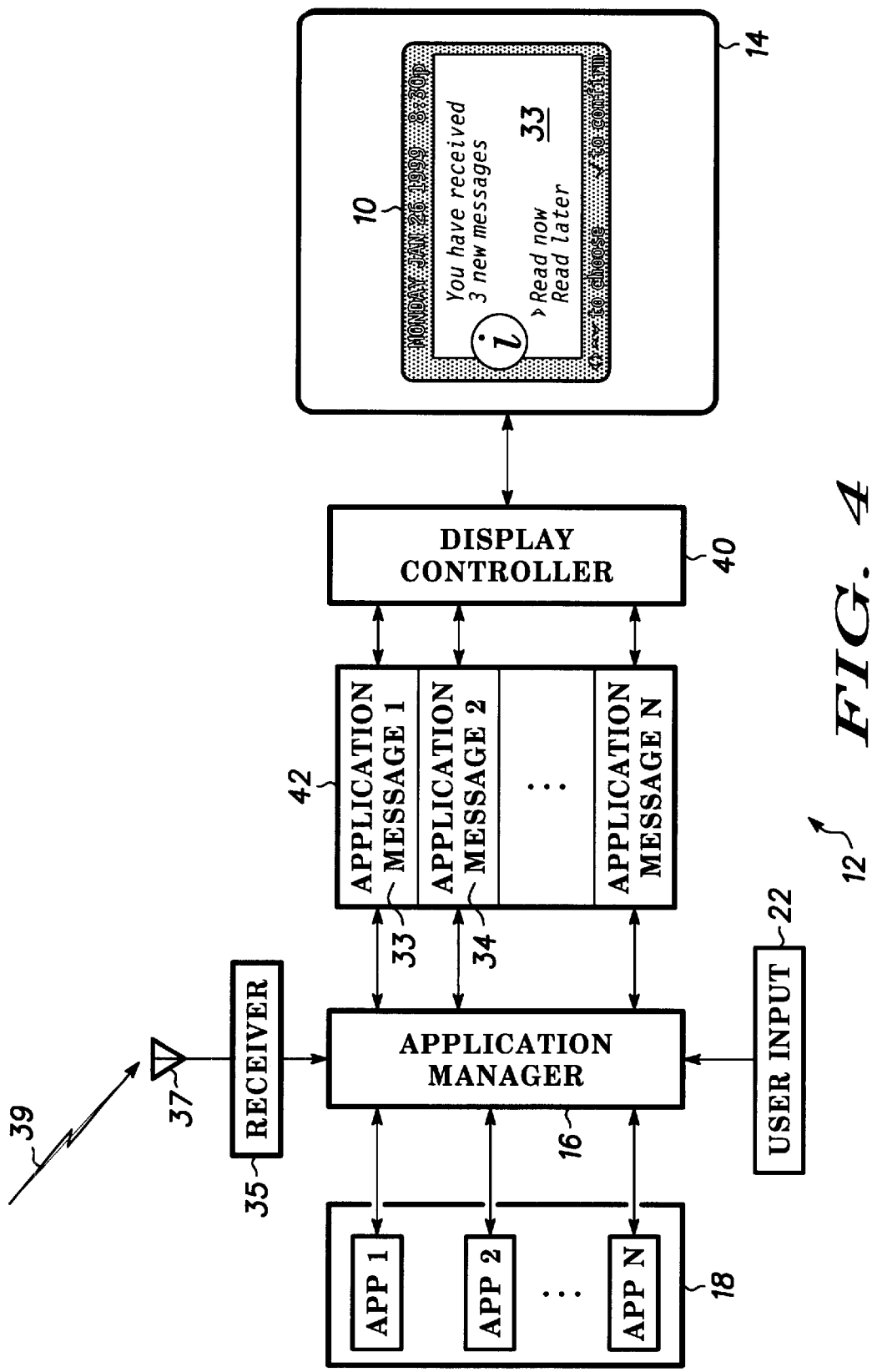

FIG. 4 is a block diagram of a preferred embodiment of the electronic device 12 of FIG. 3. The reference numbers of the embodiment of FIG. 3 have been retained for those elements that are common. The electronic device 12 includes all the elements and functionality illustrated in FIG. 3, and further comprises the receiver 35 and the antenna 37.

The antenna 37 intercepts RF signals from a wireless communication system. It will be appreciated that the wireless communication system may function utilizing any wireless RF channel, for example, a one or two way pager channel, a mobile cellular channel, or a mobile radio channel. Similarly, it will be appreciated that the wireless communication system may function utilizing other types of channels such as infrared channels. In the following description, the wireless communication system refers to any of the wireless communication systems mentioned above or an equivalent.

The antenna 37 is coupled to the receiver 35. The receiver 35 includes circuitry for receiving signals from the wireless communication system such as a message 39. Radio frequency signals received by the receiver 35 produce demodulated information. The receiver 35 further includes circuitry for processing the demodulated information using conventional demodulation techniques. The receiver 35 also includes message management capability for performing functions within the electronic device 12 in response to receipt of the message 39. For example, the receiver 35 stores the message 39 in a memory, and sends a command to activate an audible, vibratory, or visual alert to notify the user that the message 39 has been received.

To perform the necessary functions of the electronic device 12, the receiver 35 is coupled to the application manager 16. The application manager 16 operates as described previously for the electronic device 12 of FIG. 3. Further, upon receipt of the message 39, the receiver 35 informs the application manager 16 that the first application message 33 is to be deleted. The application manager 16 then deletes the first application message 33 in response to notification of receipt of the message 39, without the user input 22. The message 39 may include notification of an information update, correction of a system fault, or cancellation of an event. One skilled in the art will appreciate that the message 39 may contain one of the one of the previously mentioned notifications or an equivalent.

Figure 5:
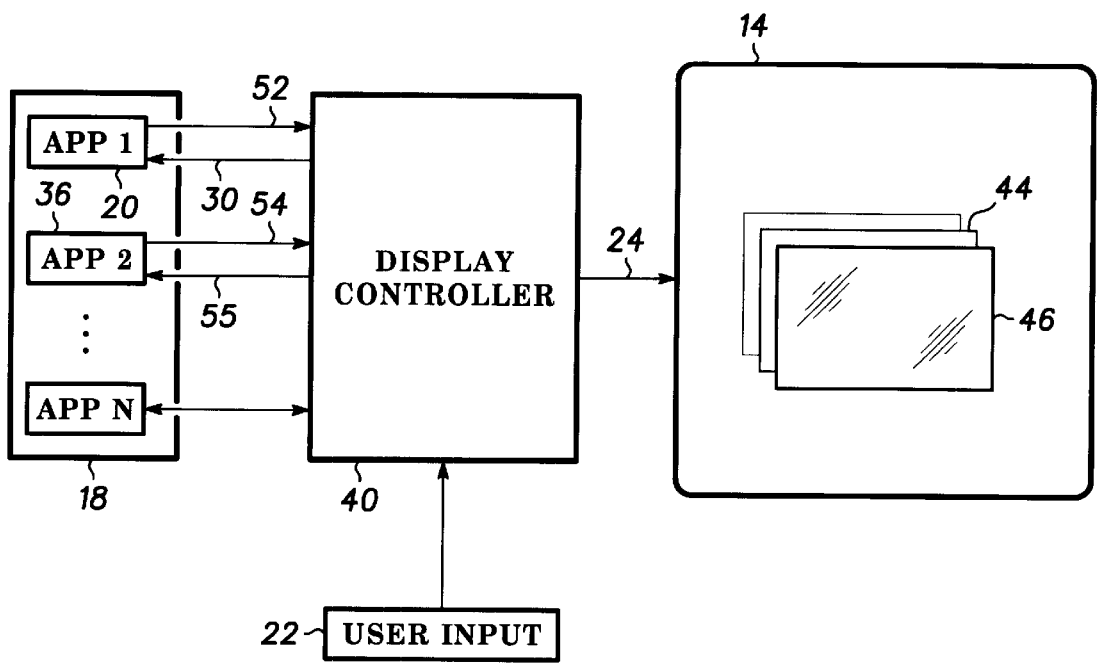

FIG. 5 shows an alternative embodiment of the electronic device 12. The electronic device 12 of FIG. 5 includes the plurality of applications 18, the display controller 40, the display 14, and the user input 22.

The plurality of applications 18 includes the first application 20 and the second application 36. The first application 20 and the second application 36 each provide a value added service such as calculator, stock market analysis, calendar, or alarm clock; and the electronic device 12 performs various functions within these applications.

The display controller 40 preferably sends the command 24 to the display 14 to generate a visual notification in response to a first input 52 from the first application 20. When the display 14 receives the command 24 from the display controller 40 in response to the first input 52, a first pop-up window 44 is displayed. The display controller 40, responsive to the user input 22, initiates the response 30 to the first application 20 for use in the operation of the first application 20 when the user input 22 is initiated in response to the first pop-up window 44.

The display controller 40 also preferably sends the command 24 to the display 14 to generate a visual notification in response to a second input 54 from the second application 36. When the display 14 receives the command 24 from the display controller 40 in response to the second input 54, a second pop-up window 46 is displayed. The display controller 40, responsive to the user input 22, initiates a second response 55 to the second application 36 for use in the operation of the second application 36 when the user input 22 is initiated in response to the second pop-up window 46.

Preferably, the second pop-up window 46 is displayed on the display 14 overlapping the first pop-up window 44 to either partially or fully hide the first pop-up window 44 from view. After the first pop-up window 44 is displayed for viewing on the display 14 and subsequently hidden from view by the overlapping second pop-up window 46, the first pop-up window 44 may become obsolete or no longer necessary. In the present invention, the first application 20 sends the first input 52 to the display controller 40 informing the display controller 40 that the first pop-up window 44 is obsolete or no longer necessary. The display controller 40 is programmed to send the command 24 to the display 14 to delete the first pop-up window 44 in response to the first input 52. The first pop-up window 44 then disappears from view without the end user interacting with the display controller 40. The end user may not even be aware that the first pop-up window 44 ever was displayed at all. This simplifies operation of the electronic device for the end user.

Alternatively, the first pop-up window 44 and the second pop-up window 46 are both associated with the first application 20. The display controller 40 sends the command 24 to the display 14 to generate a visual notification in response to the first input 52 from the first application 20. When the display 14 receives the command 24 from the display controller 40 in response to the first input 52, the first pop-up window 44 is displayed. The display controller 40, responsive to the user input 22, initiates the response 30 to the first application 20 for use in the operation of the first application 20 when the user input 22 is initiated in response to the first pop-up window 44.

The display controller 40 next sends the command 24 to the display 14 to generate a visual notification in response to the next first input 52 from the first application 20. When the display 14 receives the command 24 from the display controller 40 in response to the next first input 52, the second pop-up window 46 is displayed. The display controller 40, responsive to the user input 22, initiates the response 30 to the first application 20 for use in the operation of the first application 20 when the user input 22 is initiated in response to the second pop-up window 46.

In this alternative embodiment, the second pop-up window 46 is displayed on the display 14 overlapping the first pop-up window 44 to either partially or fully hide the first pop-up window 44 from view. After the first pop-up window 44 is displayed for viewing on the display 14 and subsequently hidden from view by the overlapping second pop-up window 46, the first pop-up window 44 may become obsolete or no longer necessary. In the present invention, the first application 20 sends the first input 52 to the display controller 40 informing the display controller 40 that the first pop-up window 44 is obsolete or no longer necessary. The display controller 40 is programmed to send the command 24 to the display 14 to delete the first pop-up window 44 in response to the first input 52. The first pop-up window 44 then disappears from view without the end user interacting with the display controller 40. The end user may not even be aware that the first pop-up window 44 ever was displayed at all.

Figure 6:
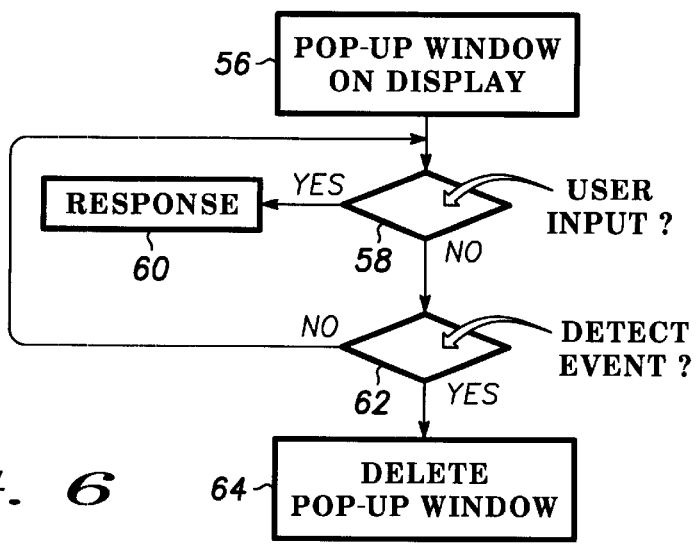
FIGS. 6, 7, 8 and 9 are flowcharts illustrating the operation of the electronic device.

FIG. 6 is a flowchart of the operation of the electronic device 12 in accordance with the present invention. The process begins with Step 56, in which the pop-up window 10 is displayed on the display 14. The pop-up window 10 contains a message responsive to the user input 22. In Step 58, the process checks for the user input 22. If the user input 22 is detected, the response 30 is generated in Step 60. If no user input 22 is detected, the process then looks for detection of an event in Step 62. If no event is detected, the process cycles back to Step 58 and continues querying for a user input or event (Step 62). If an event is detected, in Step 64 the pop-up window 10 is deleted.

Figure 7:
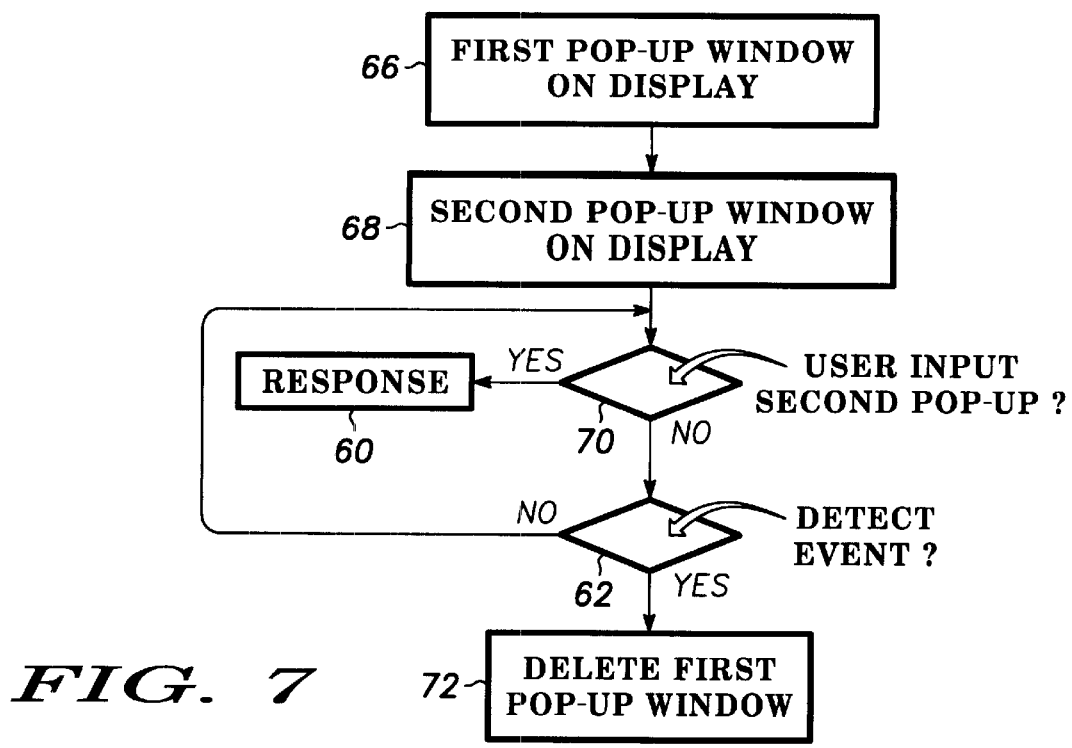

FIG. 7 is a flowchart of the operation of the electronic device 12 in accordance with the present invention. The process begins with Step 66, in which the first pop-up window 44 is displayed on the display 14. Next, in Step 68, the second pop-up window 46 is displayed on the display 14. The second pop-up window 46 preferably overlaps the first pop-up window 44 such that either a portion or the entire first pop-up window 44 is hidden from viewing by the end user. The system, for example the display controller 40, next, in Step 70, queries for the user input 22 in response to the second pop-up window 46. In Step 60, if the user input 22 is detected in response to the second pop-up window 46, the response 30 is generated. In Step 62, if no user input 22 has been detected for the second pop-up window 46, the system, for example the display controller 40, queries for detection of an event. If no event is detected, the process returns to Step 70 looking for the user input 22 for the second pop-up window 46. In Step 72, if an event is detected, the first pop-up window 44 is deleted.

Figure 8:
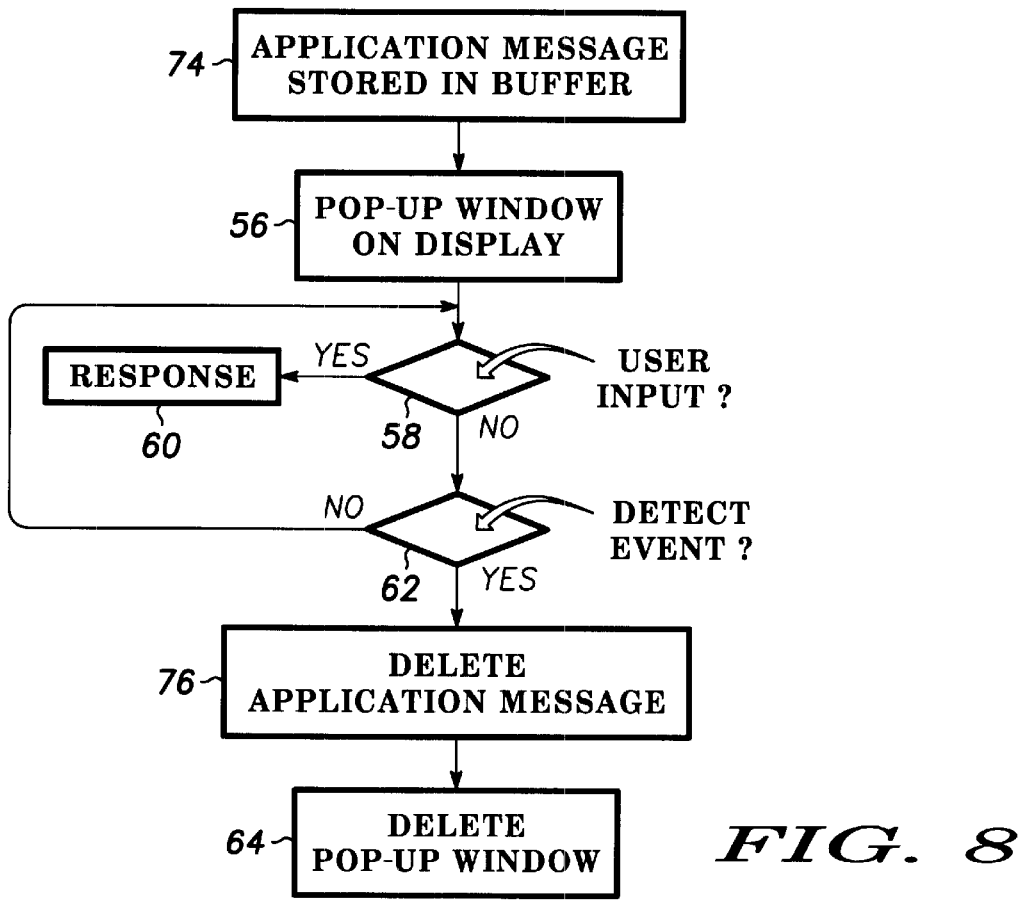

FIG. 8 is a flowchart of the operation of the electronic device 12 in accordance with the present invention. The process begins with Step 74 in which the first application message 33 is stored in the buffer 38. Next, in Step 56, the pop-up window 10 is displayed on the display 14. In the next Step 58, the system checks for the user input 22. In Step 60, if the user input 22 is detected, the response 30 is generated. If no user input 22 is generated, the process continues to Step 62 and looks for the detection of an event. If no event is detected, the process returns to Step 58 and continues looking for user input 22. In Step 76, if an event is detected, the first application message 33 is deleted from the buffer 38. Next, in Step 64, the pop-up window 10 is deleted from the display 14.

Figure 9:
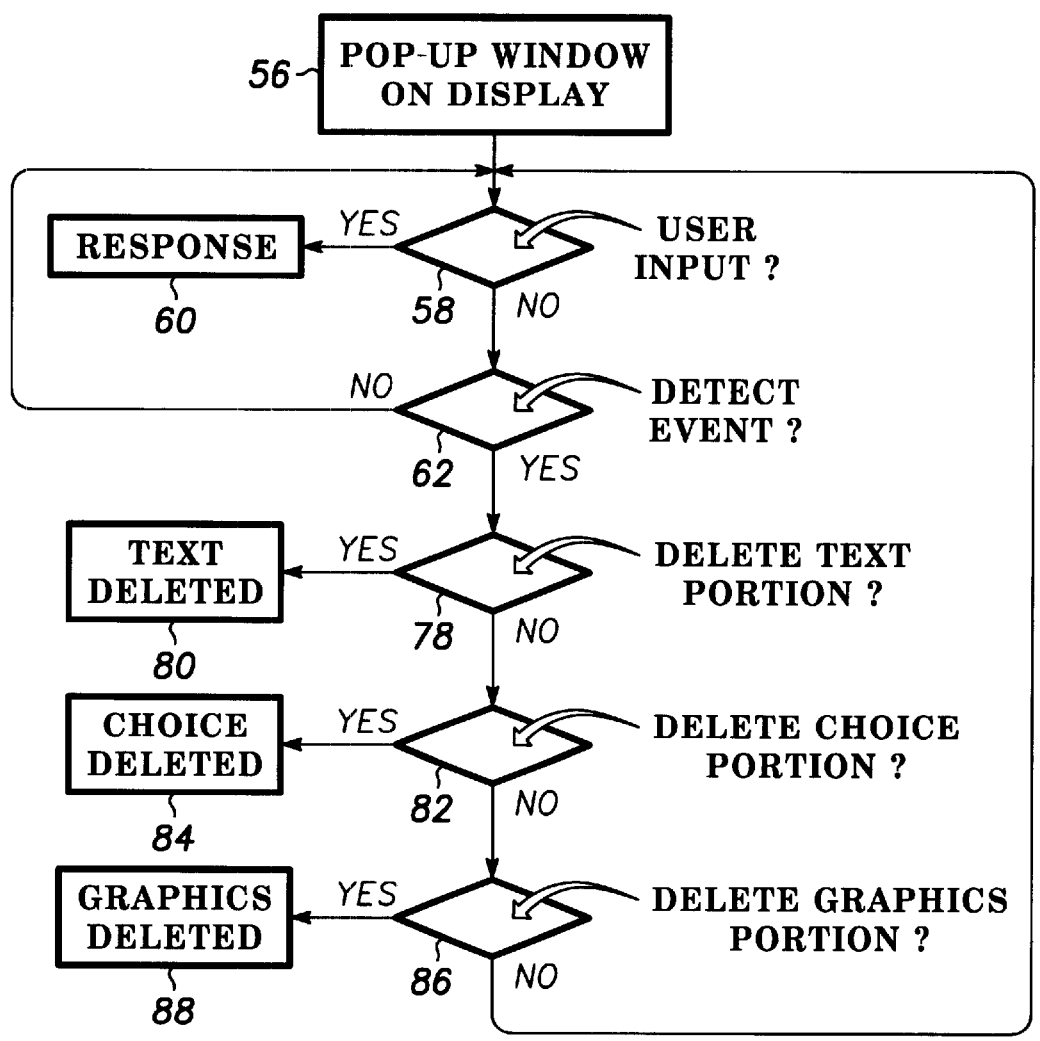

FIG. 9 is a flowchart of the operation of the electronic device 12 in accordance with the present invention. The process begins with Step 56, in which the pop-up window 10 is displayed on the display 14. The pop-up window 10 contains a message responsive to the user input 22. In Step 58, the process checks for the user input 22. If the user input 22 is detected, the response 30 is generated in Step 60. If no user input 22 is detected, the process then looks for detection of an event in Step 62. If no event is detected, the process cycles back to Step 58 and continues querying for a user input (Step 58) or event (Step 62). If an event is detected, the event is queried in Step 78 for information leading to deletion of the text portion 19 of the pop-up window 10. If information leading to deletion of the text portion 19 of the pop-up window 10 is detected in the event, the text portion 19 is deleted in Step 80. If no information leading to deletion of the text portion 19 of the pop-up window 10 is detected, the event is further queried in Step 82 for information leading to deletion of the choice portion 21 of the pop-up window 10. If information leading to deletion of the choice portion 21 of the pop-up window 10 is detected in the event, the choice portion 21 is deleted in Step 84. If no information leading to the deletion of the choice portion 21 is detected, the event is further queried in Step 86 for information leading to deletion of the graphics portion 23 of the pop-up window 10. If information leading to deletion of the graphics portion 23 of the pop-up window 10 is detected in the event, the graphics portion 23 is deleted in Step 88. If no information leading to deletion of the graphics portion 23 of the pop-up window 10 is detected, the process cycles back to step 58 and looks for user inputs and events.

The method and apparatus for automatic deletion of pop-up windows provided for by the present invention simplifies user operation of electronic devices while at the same time lower cost, size, memory, and display requirements. As the functionality and complexity of these devices continues to grow, this invention will equally benefit end users, manufacturers, system providers and application programmers.

Although the invention has been described in terms of preferred embodiments, it will be obvious to those skilled in the art that various alterations and modifications may be made without departing from the invention. Accordingly, it is intended that all such alterations and modifications be considered as within the spirit and scope of the invention as defined by the appended claims.

What is claimed is:

1. An electronic device comprising:
   a display;
   a plurality of applications, wherein at least one application generates a pop-up window which is displayed on the display, wherein the pop-up window comprises a text portion, a choice portion, and a graphics portion;
   an application manager coupled between the application and the display; and
   a receiver coupled to the application manager for receiving a message, wherein the message includes a notification to delete a portion of the pop-up window selected from the group consisting of the text portion, the choice portion, and the graphics portion, and further wherein the application manager deletes the portion of the pop-up window in response to receipt of the notification within the message by the receiver.

2. An electronic device as recited in claim 1 wherein the pop-up window includes a unique identifier, wherein the message includes the unique identifier, and further wherein the application manager confirms the deletion of the portion of the pop-up window using the unique identifier.

3. An electronic device comprising:
   a display including at least one pop-up window which is displayed;
   a plurality of applications having corresponding application messages, wherein the plurality of applications share the pop-up window, and further wherein the plurality of applications includes a first application having a corresponding first application message and a second application having a corresponding second application message;

a buffer for storage of one or more application messages including the first application message and the second application message;

an application manager coupled between the plurality of applications and the buffer, wherein the application manager gives ownership of the pop-up window to the first application; and a display controller coupled between the buffer and the display, wherein the display controller retrieves the first application message from the buffer and displays the first application message on the pop-up window of the display in response to the application manager giving ownership of the pop-up window to the first application, wherein the application manager deletes the second application message stored in the buffer in response to an input from the second application prior to displaying the second application message on the pop-up window.

4. An electronic device as recited in claim 3 further comprising a receiver coupled to the application manager for receiving a message, wherein the message includes a notification to delete the application message, wherein the application manager deletes the application message stored in the buffer in response to receipt of the notification within the message by the receiver.

5. An electronic device comprising:

a display including a first pop-up window which is displayed and a second pop-up window which is displayed, wherein the second pop-up window overlaps the first pop-up window, wherein the first pop-up window comprises a text portion, a choice portion, and a graphics portion;

a first and-second application associated with the first and second pop-up windows respectively;

a receiver for receiving a message, wherein the message includes a notification to delete a portion of the pop-up window selected from the group consisting of the text portion, the choice portion, and the graphics portion; and a display controller coupled to the receiver, and coupled between the first and second applications and the display, wherein the display controller deletes a portion of the first pop-up window in response to receipt of the notification within the message by the receiver.

6. In an electronic device having a display including at least one pop-up window and having a receiver for receiving and processing a message, a method for automatic deletion of a pop-up window comprising:

displaying the pop-up window on the display, wherein the pop-up window comprises a text portion, a choice portion, and a graphics portion;

detecting receipt of a message including a notification to delete a portion of the pop-up window selected from the group consisting of the text portion, the choice portion, and the graphics portion; and deleting the portion of the pop-up window in response to receipt of the notification.

7. In an electronic device having a display including at least one pop-up window, a plurality of applications including a first application and a second application, wherein the plurality of applications share the pop-up window, an application manager, a buffer, and a display controller; a method for automatic deletion of an application message comprising:

storing a first application message corresponding to the first application and a second application message corresponding to the second application in the buffer;

giving ownership of the pop-up window to the first application;

retrieving the first application message from the buffer and displaying the first application message on the pop-up window;

detecting an event by the second application; and deleting the second application message from the buffer prior to displaying the second application message on the pop-up window in response to the detecting of the event by the second application.

8. A method for automatic deletion of an application message as recited in claim 7 wherein the event is an input from the second application.

9. A method for automatic deletion of an application message as recited in claim 7 wherein the electronic device further comprises a receiver for receiving a message, wherein the message includes a notification to delete the pop-up window, wherein the event is a receipt of the notification within the message.

* * * * *